(12) United States Patent
Kirkwood et al.

(10) Patent No.: US 8,918,978 B2
(45) Date of Patent: Dec. 30, 2014

(54) SELF EXPANDING FASTENER

(71) Applicants: Joan M. Crow, Bellevue, WA (US); The Boeing Company, Chicago, IL (US)

(72) Inventors: Brad L Kirkwood, Kent, WA (US); Lee C. Firth, Renton, WA (US); Richard D. Widdle, Carnation, WA (US); Wesley B. Crow, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 28 days.

(21) Appl. No.: 13/710,624

(22) Filed: Dec. 11, 2012

(65) Prior Publication Data
US 2013/0097847 A1  Apr. 25, 2013

Related U.S. Application Data

(63) Continuation of application No. 12/632,604, filed on Dec. 7, 2009, now Pat. No. 8,388,292.

(51) Int. Cl.
| | |
|---|---|
| *B23P 11/02* | (2006.01) |
| *F16B 13/04* | (2006.01) |
| *F16B 3/00* | (2006.01) |
| *F16B 1/00* | (2006.01) |

(52) U.S. Cl.
CPC . *F16B 13/04* (2013.01); *F16B 3/00* (2013.01); *F16B 1/0014* (2013.01)
USPC .......................................... 29/447; 29/525.05

(58) Field of Classification Search
CPC .......... F16B 19/06; F16B 1/0014; F16B 5/04; C22C 19/03; C22F 1/10
USPC .............................................. 29/525.05, 447
See application file for complete search history.

(56) References Cited

U.S. PATENT DOCUMENTS

| | | | |
|---|---|---|---|
| 326,100 | A | 9/1885 | Bray |
| 2,510,693 | A | 6/1950 | Green |
| 4,896,955 | A | 1/1990 | Zider et al. |
| 5,120,175 | A * | 6/1992 | Arbegast et al. ............... 411/501 |
| 5,195,855 | A | 3/1993 | Atkinson |
| 5,265,456 | A | 11/1993 | Kennedy et al. |
| 5,484,244 | A | 1/1996 | Glovan |

(Continued)

FOREIGN PATENT DOCUMENTS

DE   102005053987 A1 *  5/2007

OTHER PUBLICATIONS

PCT International Search Report, Mar. 18, 2011.

*Primary Examiner* — David Bryant
*Assistant Examiner* — Ruth G Hidalgo-Hernande
(74) *Attorney, Agent, or Firm* — Toler Law Group, PC (57) ABSTRACT

A method to join a first structure to a second structure comprises aligning a first hole in the first structure with a second hole in the second structure and inserting a fastener into the first hole and the second hole. The fastener comprises a shape memory alloy which was formed into a first shape having a diameter slightly larger than a diameter of the first hole and the second hole when the shape memory alloy was in an austenite state and reduced to a second shape having a diameter less than the diameter of the first hole and the second hole when the shape memory alloy was in a martensite state. The method further comprises heating the fastener above an austenite start transition temperature.

13 Claims, 4 Drawing Sheets

(56) References Cited

U.S. PATENT DOCUMENTS

| | | |
|---|---|---|
| 5,535,126 A | 7/1996 | Mercier |
| 5,722,709 A | 3/1998 | Lortz |
| 5,772,378 A | 6/1998 | Keto-Tokoi |
| 6,089,781 A | 7/2000 | Kellberg |
| 6,637,995 B1 | 10/2003 | White |
| 6,688,828 B1 * | 2/2004 | Post .......................... 411/383 |
| 2005/0244245 A1 | 11/2005 | Efremov |

* cited by examiner

SELF EXPANDING FASTENER

RELATED APPLICATIONS

This application is a continuation of U.S. patent application Ser. No. 12/632,604, to Kirkwood, et al., entitled SELF EXPANDING FASTENER, filed Dec. 12, 2009, the disclosure of which is incorporated herein by reference in its entirety.

BACKGROUND

The subject matter described herein relates to fasteners. More particularly, the disclosure relates to a self expanding fastener, method of using a self-expanding fastener, and structural assemblies comprising self expanding fasteners.

Forming structures for vehicles such as aircraft, rockets, motor vehicles or ships presents a need to join two or more structural components. For example, an aircraft wing skin needs to be joined to a spar or rib, a fuselage skin to a frame or stringer/longeron or a skin to another skin section through a lap splice joint. Various types of fasteners may be used to join such components.

Fasteners referred to as Class I fasteners in the aerospace industry provide effective load transfer by shear through contact of the mechanical fastener with the structural components that make up the joint. Many aerospace structures utilize Class 1 fasteners which have diameters that measure approximately 0.003" less than the hole size. A Class I fastener has a tight fit of the fastener to its hole, reduces the Hertzian contact stress in bearing with the hole sidewall, and does not create interference of the fastener with the hole facilitating fastener insertion.

Non interference fasteners do not completely fill the fastener hole, resulting in an unfilled hole which has a stress concentration at the edge of the hole, which in turn lowers the fatigue life of a structure. The stress concentration on a unfilled hole means that a structure made of an alloy such as, for example, a Ti-6Al-4V, a common titanium alloy, will begin to plastically deform at the hole edge at a stress level of only 40 Ksi compared to this alloy's normal yield stress of 120 Ksi which is the stress where yielding would begin to occur in a structure that does not have a hole.

Fasteners that have a shank which is larger than the size of the hole(s) into which the fastener is fit, these are commonly referred to as interference fit fasteners. Interference fit fasteners have an advantage over Class I fastener joints in that they create no stress raiser in the structural components being joined, yielding a long fatigue life. However, they are not often used because specialized freeze insertion is typically required to fit the fastener in the hole.

Thus, stronger, lighter joints with longer fatigue lives can be created with any fastener that can fill a fastener hole to remove the stress concentration effect of the hole. Further, the fastener should be easily inserted into the hole, and should leave compressive residual stresses on the hole surface to increase the fatigue life of the structure.

SUMMARY

In various aspects, self expanding fasteners, methods to use such fasteners, and structures incorporating such fasteners are provided. In one aspect there is provided a method to join a first structure to a second structure. In one embodiment the method comprises aligning a first hole in the first structure with a second hole in the second structure and inserting a fastener into the first hole and the second hole. The fastener comprises a shape memory alloy which was first formed into a first shape having a diameter slightly larger than a diameter of the first and the second holes of the joint when the shape memory alloy was in its higher temperature austenite phase. This fastener is formed to a second shape having a diameter less than the diameter of the first and second holes of the joint when the shape memory alloy is in the lower temperature martensite phase. The method further comprises inserting the fastener at a temperature when the fastener is in the martensitic phase state and either heating the fastener or allowing it to warm to ambient temperature, where it is above its austenite start transition temperature. Under the heating, the fastener initiates free expansion from the second shape back to the first shape and establishes physical interference contact with the surface of the first and second holes. Continuing to heat the fastener through the temperature range from the austenite start to austenite finish and beyond allows the fastener to first initiate plastic deformation in the structural components that it is joining, and finally, being plastically deformed itself.

In another aspect there is provided a structural assembly. In one embodiment, the structural assembly comprises a first structural component comprising a first hole having a first diameter and a second structural component comprising a second hole having a second diameter, both holes have approximately equal diameters. The structural assembly further comprises a fastener dimensioned to fit into the first hole and the second hole. The fastener comprises a shape memory alloy which was formed and heat treated into a first shape having a diameter slightly larger than a diameter of the first hole and the second hole when the shape memory alloy was in an austenitic (high temperature) phase. This fastener was subsequently reduced to a second shape having a diameter less than the diameter of the first hole and the second hole, when the shape memory alloy was in a martensitic (low temperature) phase. After fastener insertion, the fastener is heated above an austenite start transition temperature, such that the fastener initiates free expansion from the second shape back to the first shape. During the expansion, the nitinol fastener establishes physical contact with the surface of the first hole and the second hole, and during further heating the constrained expansion of the nitinol fastener causes the first structure and second structure near the holes, and later the fastener itself, to undergo plastic deformation.

In yet another aspect, there is provided a fastener to secure a first structure comprising a first hole having a first diameter to a second structure comprising a second hole having a second diameter, approximately equal to the first diameter. In one embodiment the fastener comprises a body dimensioned to fit in the first hole and the second hole. The fastener body comprises a shape memory alloy which was formed into a first shape having a diameter slightly larger than a diameter of the first hole and the second hole when the shape memory alloy was in an high temperature austenite phase, and reduced to a second shape having a diameter less than the diameter of the first hole and the second hole when the shape memory alloy was in the lower temperature martensite phase. After insertion into the two holes, the fastener body is heated above an austenite start transition temperature, such that the body initiates free expansion from the second shape back to the first shape and establishes physical contact with the surface of the first hole and the second hole, and during further heating the first structure and the second structure proximate the holes and the fastener body itself undergo plastic deformation.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, and components have not been illustrated or described in detail so as not to obscure the particular embodiments.

Described herein are embodiments of a self expanding fastener, methods for using the same and structural assemblies incorporating self expanding fasteners. In embodiments, a fastener as described herein may be used to hold two or more structures together and possesses the ability to expand after insertion to place the fastener into either interference or close contact with the two structures that it is fastening. The expansion of the fastener in the holes may plastically work harden the surface of the hole in the structure and create a compressive residual stress that is approximately equal to the yield stress of the materials from which the structures and the fastener are formed, respectively. In use, the fastener expands to fill the holes in the structures and reduces the stress concentration effect of the hole. Removing the stress concentration of the hole and the creation of high compressive residual stresses at the interface significantly increases the fatigue life of the structure. Further, since the expanding fastener fills the hole to enhances the fatigue life of the structure, it is not necessary to drill high tolerance, close fitting Class I holes to attain a high quality fastener joint.

In one aspect, fasteners according to embodiments that utilize the shape memory effect of certain metal alloys referred to as shape memory alloys. Broadly speaking, shape memory alloys exist in one of two crystal structures, commonly referred to as martensite, the low temperature phase and austenite, the higher temperature phase. A shape memory alloy may be formed into a shape while in its high temperature austenite phase. When a shape memory alloy device is deformed while it is in its lower temperature martensite phase, the device will retain the deformed shape until it is heated back to the austenite phase, whereupon it recovers its original shape, this is known as the shape memory effect.

In some embodiments a fastener may be formed from an alloy of shape memory effect metal alloys, such as alloys based upon Beta Cu-40% Zn for lower strength metal structures (i.e., yield strength below 70 Ksi) or from alloys of NiTi (commonly known as Nitinol) for metal alloys with yield strengths ranging from 100 Ksi to 200 Ksi. The specific alloy and microstructure may be chosen for each joint design.

Figure 1:
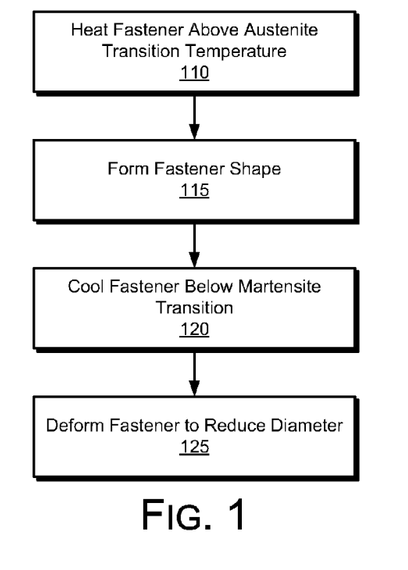
FIG. 1 is a flow diagram illustrating operations in a method to make a fastener, according to embodiments.
Figure 2:
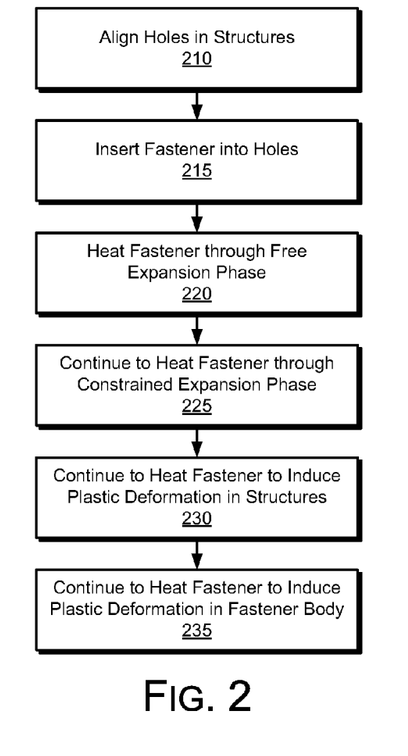
FIG. 2 is a flow diagram illustrating operations in a method to join two or more structures, according to embodiments.
Figure 3:
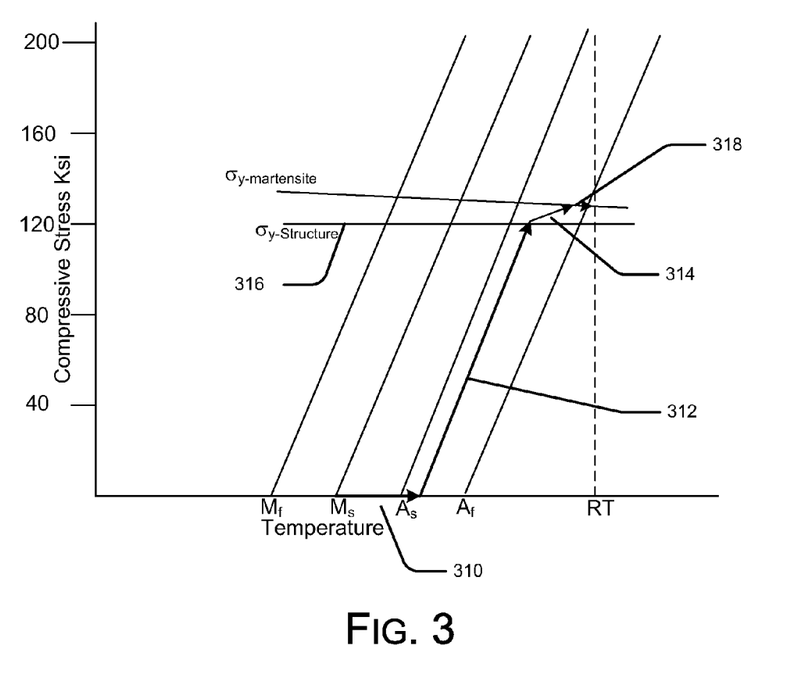
FIG. 3 is phase diagram illustrating a transformation in the structure of a self expanding fastener, according to embodiments.

Referring now to FIGS. 1-3, in some embodiments the fastener may be formed by first heating the alloy in a constraint tool, such that the alloy is above the austenite transition temperature (operation 110). This is usually done by annealing the device at temperatures from 500 to 700 C, below the order-disorder transformation in nitinol. One skilled in the art will recognize that the austenite transition temperature will vary as a function of the alloy used to form the fastener, for example nitinol alloys that are rich in nickel or that have cobalt or iron substituted for nickel in the alloy chemistry will have austenite start transformation temperatures below room temperature.

Referring to FIG. 1, at operation 115 the fastener is formed into a first shape when the alloy is in its austenite state. The specific shape of the fastener is not critical. Several embodiments of fastener shapes are provided below with reference to FIGS. 4-6. The non cylindrical "hourglass" illustrated in FIGS. 6A-6B have the ability to expand fully into the structural components being joined near their surface. This shape has the ability to put clamping force onto the joint and is able to resist being pulled out of the structure and is able to perform as fastener without a head, making it the ideal "flush head" rivet to utilize the expanding nitinol fastener concept.

At operation 120 the fastener is cooled below its martensite transition temperature. In some embodiments this may be accomplished by cooling the fastener in a slow controlled manner to promote large martensite variant sizes across the body of the fastener. Cooling the fastener in a slow controlled manner controls the yield strength of the martensitic memory fastener, so that it will be deformed after first deforming the structural components that it is joining during the heat-up after fastener insertion. This enables the fastener to expand, deform the holes and be deformed itself, so the nitinol fastener will not fall out of the interference joint if the structure is subsequently cooled below the martensite start temperature of the martensitic memory alloy fastener. Martensitic memory alloy fasteners with a plastic yield strength greater than the ultimate strength of one or both of the structural components being joined may be still be employed if the martensite start transformation temperature of the fastener material chosen is lower than the lowest possible use temperature of the structure. This is because the fastener will not be deformed after insertion and heating, "locking" it into the structure. In other embodiments the fastener may be cooled by quenching the fastener in a cooling liquid to rapidly cool the fastener to promote small variant sizes in the martensite grain structure for a high yield strength for joining structures fabricated from high strength nickel based alloys, age hardened PH stainless steels or beta titanium alloys or quenched and tempered tool steels with yield strengths in excess of 150 Ksi.

After the fastener has cooled to the martensite phase below the martensitic finish transformation temperature, the fastener may be deformed (operation 125) to reduce its diameter. In some embodiments the fastener may be swaged to reduce its diameter by an amount between two percent (2%) up to ten percent (10%) in nitinol. After the fastener is swaged, the fastener may be maintained at temperatures below the austenite start transformation temperature until the fastener is inserted into the hole during assembly. The austenite start transformation temperature of some shape memory alloys is above environmental temperatures at approximately 90 degrees Celsius to 100 degrees Celsius. Thus, the fastener may be packaged, shipped, and otherwise moved in its martensitic phase.

FIG. 2 is a flow diagram illustrating operations in a method to join two or more structures, according to embodiments. The operations of FIG. 2 will be explained with reference to a single hole. One skilled in the art will recognize that most joining operations utilize multiple fasteners in multiple holes while joining two or more structural components together. Thus, in practice certain operations of FIG. 2 will be repeated in multiple holes. Referring now to FIG. 2, at operation 210 the holes in the structures to be joined are aligned along a common axis. At operation 215 the fastener is inserted into the holes of two structural components.

At operation 220 the fastener is heated through a free expansion phase in which there is no physical contact between the fastener and the inner surfaces of the holes into which the fastener is placed. In some embodiments the heating may occur by inserting a subambient transformation martensitic memory alloy at a subambient temperature and allowing it to naturally warm up by contact with the structural components or by inserting a martensitic memory alloy with a transformation above ambient temperatures and using electric resistive heating to warm the fastener through its transformation temperature range. Referring to FIG. 3, this operation is illustrated by the arrow 310 on the diagram. During this phase of the heating operation the fastener crosses the austenite start transition temperature (As), causing the fastener to begin to transform to austenite and expand to its initial larger shape. As the fastener undergoes free expansion, it has not yet contacted the hole surface and the compressive stress on the fastener remains at zero.

At operation 225 the fastener is continuing to be heated through the austenite transformation and the growth of the fastener has established contact between the fastener and the inner surfaces of the holes into which the fastener is placed. Further heating of the fastener in this constrained expansion arrangement will no longer cause it to expand but instead will increase the compressive stress between the fastener and hole surface. Referring to FIG. 3, constrained expansion initiation event is illustrated by arrow 312 on the diagram of the holes.

At operation 230 the fastener is heated enough to be above the yield strength of the structural components to induce plastic deformation at the hole surface in the structures being joined. Referring to FIG. 3, this event is illustrated by arrow 314 on the diagram. This yield stress is indicated on the diagram by line 316. As the fastener attempts to continue expanding, the material around the hole in the structures being joined undergoes further plastic deformation, increasing the strength of the material by cold work.

At operation 235 the fastener is heated to induce plastic deformation in the fastener. Referring to FIG. 3, this event is illustrated by arrow 318 on the diagram. This event begins when the compressive stress between the fastener and the hole hits the yield stress of the martensitic memory material from which the fastener is formed. This yield stress is indicated on the diagram by line 318. As the fastener attempts to continue expanding, the fastener and the structure undergo further plastic deformation, increasing the strength of both components at the interface of their contact.

Thus, the operations of FIG. 2 illustrate heating a shape memory through four distinct phases: a free expansion phase, a constrained expansion phase, a phase in which plastic deformation is induced at the interface in the structural materials being joined, and a phase in which plastic deformation is induced in the fastener. Plastic deformation in the untransformed martensite structure of the martensitic memory alloy in the fastener prevents any further transformation of the martensite fastener to austenite, effectively locking the fastener in the hole. The plastic deformation of the fastener prevents the reversible nature of the thermoelastic martensitic memory alloy transformation from occurring. In other words, plastic deformation of the fastener effectively locks the fastener in its current state such that the fastener will not shrink and fall-out of the hole if it is subsequently cooled to below the martensitic start transformation temperature. The plastic deformation "locking" allows martensitic memory alloys whose transformation temperatures are at or above ambient temperature to be used. By deforming the shank in the hole, the yield strength of the fastener is also increased to a level that is equal to the structural material that it is joining. This deformation increases the fastener's shear strength so that it can transfer more shear load between the structures in the joint stack-up.

In practice, the composition of the alloys from which the fastener and the structures are composed may be selected such that the yield stress of the structures is slightly lower than the yield stress of the fastener, as illustrated in FIG. 3. In one embodiment, the fastener is developed from a Nitinol alloy in which the martensite structure begins to plastically deform at a stress level 5% to 10% (~5 to 10 Ksi) greater than the yield stress of the structural material it is joining, so it will be plastically deformed after work hardening the hole.

Further, the amount of expansion and the amount of deformation that occurs within the structure is determined by the amount of cold swaging done on the fastener. Larger deformation during the swaging operation yields a larger zone of plastic deformation and more deformation around the hole. In practice, the upper limit of such deformation is approximately 8% to 10% in nitinol, less in the beta brass alloys.

The plastic deformation in the untransformed martensite structure of the martensitic memory alloy or Nitinol shank will prevent any further transformation in the martensite fastener, ring or rivet and will "lock" the fastener into the hole. By deforming the shank in the hole, the yield strength of the fastener is increased to a level equal to the structural material that it is joining. This deformation increases the fastener's shear strength so that it can transfer more shear load between the sheets in the joint stack-up.

Figure 4A:
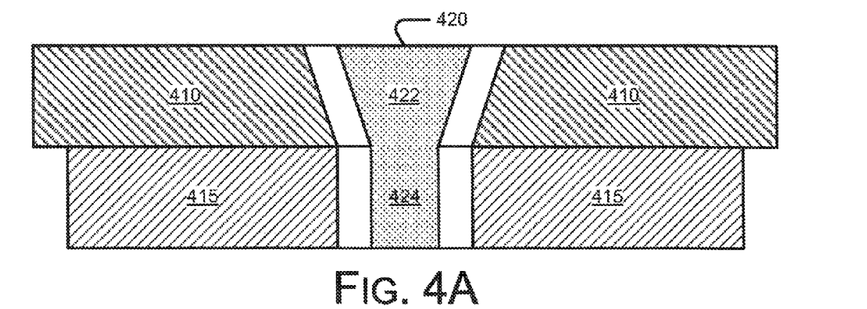
FIGS. 4A and 4B are cross-sectional illustrations of a structural assembly and a fastener, according to embodiments.
Figure 4B:
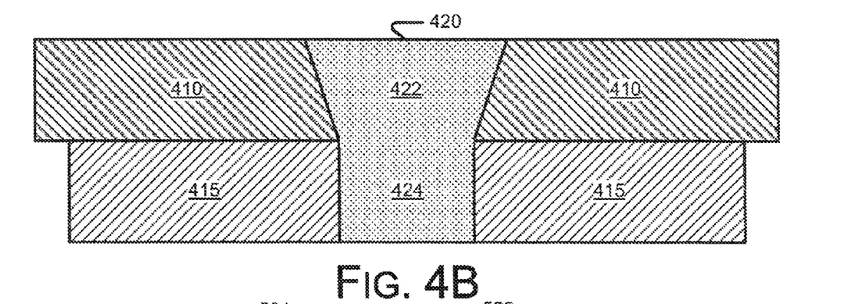

As described above, the particular shape of the fastener is not critical though some of the shapes, such as the "hourglass" provide additional benefits as previously noted. FIGS. 4A-4B, 5A-5B, and 6A-6B are cross-sectional views of a structural assembly and fasteners, according to embodiments. Referring first to FIG. 4A, in one embodiment a fastener 420 may be used to secure a first structure 410 to a second structure 415. FIG. 4A depicts the fastener 420 in its martensite state, wherein the fastener is smaller than the hole in the structures 410, 415. The fastener 420 comprises a head 422 and a shank 424. Once the fastener is positioned in the hole, the fastener may be heated as described above with reference to FIG. 2. As a result, the fastener expands and locks into the hole as illustrated in FIG. 4B.

Figure 5A:
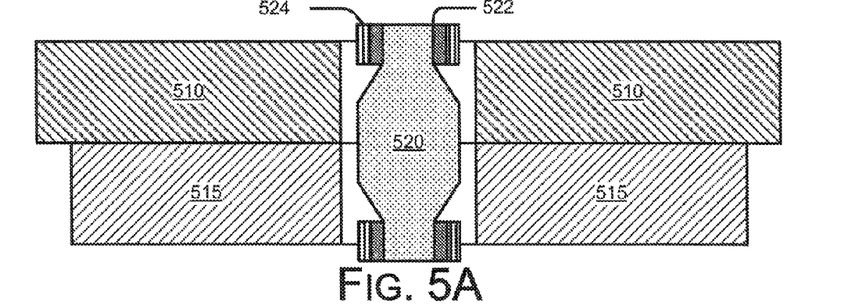
FIGS. 5A and 5B are cross-sectional illustrations of a structural assembly and a fastener, according to embodiments.
Figure 5B:
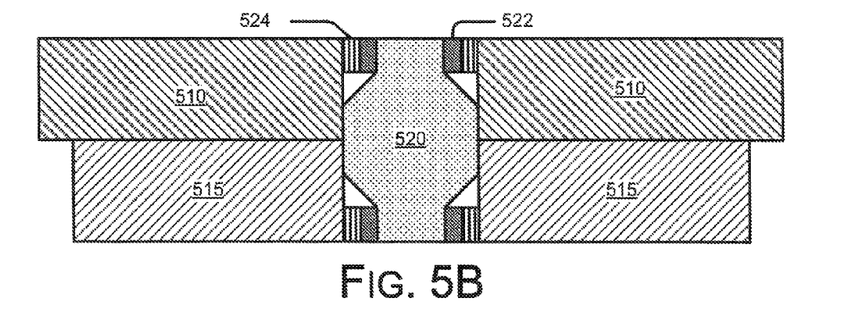

Referring now to FIG. 5A, in one embodiment a fastener 520 may be used to secure a first structure 510 to a second structure 515, FIG. 5A depicts the fastener 520 in its martensite state, wherein the fastener is smaller than the hole in the structures 510, 515. The fastener 520 comprises a shaped body, a first lock ring 522, and a second lock ring 524. Again, once the fastener 520 is positioned in the hole, the fastener 520 may be heated as described above with reference to FIG. 2. As a result, the fastener expands and locks into the hole as illustrated in FIG. 5B. One advantage associated with using lock rings 522. 524 is that two different martensitic memory alloys with different transformation temperatures and/or plastic yield stresses or amounts of deformation may be employed for a two material structural stack joint so that each ring is optimized for each material in the joint. For example, the lock ring of a fastener that joins a polymeric graphite composite structure to a titanium structure would have less expansion on transformation than the lock ring used on the titanium side of the joint to only just "fill" the hole to eliminate the stress concentration caused by the hole, but not to deform the polymeric composite (like the titanium lock ring) because that would cause cracking.

Figure 6A:
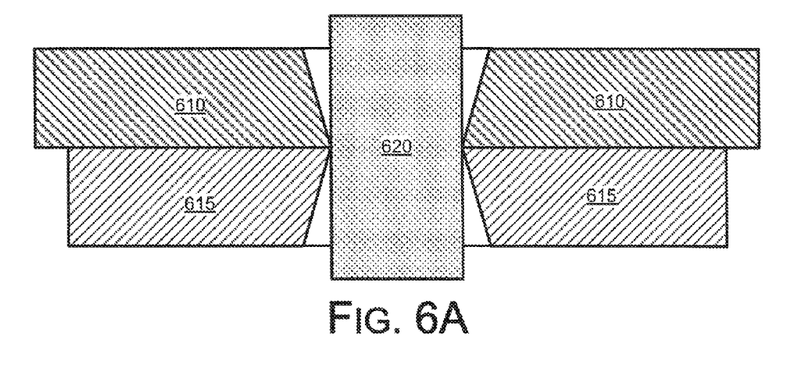
FIGS. 6A and 6B are cross-sectional illustrations of a structural assembly and a fastener, according to embodiments.
Figure 6B:
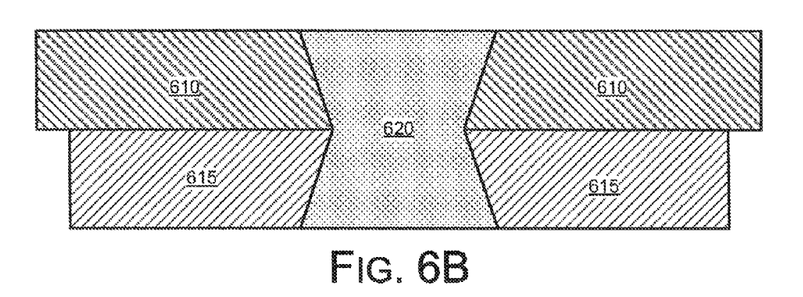

FIGS. 6A and 6B are cross-sectional views of a structural assembly and a fastener, according to embodiments. Referring first to FIG. 6A, in one embodiment a fastener 620 may be used to secure a first structure 610 to a second structure 515. FIG. 6A depicts the fastener 520 in its martensite state, wherein the fastener is smaller than the hole in the structures 610, 515. Once the fastener 520 is positioned in the hole, the fastener may be heated as described above with reference to FIG. 2. As a result, the fastener 620 expands and socks into the hole as illustrated in FIG. 6B.

Figure 7:
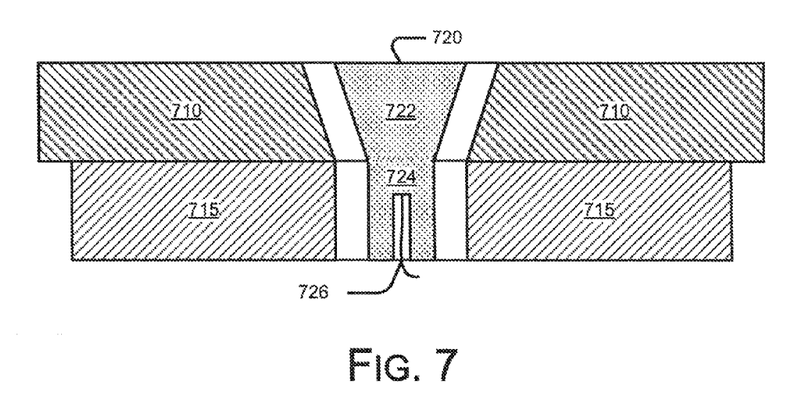
FIG. 7 is cross-sectional illustration of a structural assembly and a fastener, according to embodiments.

The specific mechanism by which the fastener(s) are heated is not critical. In some embodiments the fastener(s) may be positioned in their respective holes and the entire structure may be heated. In other embodiments the fastener(s) may be heated by applying an external heat source to the fastener(s). In still other embodiments, it may be beneficial to select a martensitic memory alloy for the fastener whose transformation temperatures are subambient, so that no heating of the fastener is needed to cause it to transform, the natural heat flow from the ambient temperature structure to the cold fastener will perform the task. Referring now to FIG. 7, in still other embodiments the fastener(s) 720 may comprise a hole drilled into the shank 724 of the fastener(s) 720 to receive a heating element 726. The heating element 726 may be embodied as an electrical resistance heating element or the like. When the heating element 726 is activated the fastener 720 is heated, which causes the fastener 720 to expand as describe above, thereby locking the first structure 710 to the second structure 715.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to join a first structure to a second structure, the method comprising:
    aligning a first hole in the first structure with a second hole in the second structure;
    inserting a fastener in a martensite state into the first hole and the second hole, wherein the fastener comprises a shape memory alloy, wherein the fastener is configured to change from a first shape in the martensite state back to a second shape in an austenite state when the fastener is heated to a first temperature above an austenite start transition temperature, wherein the second shape has a first diameter larger than a second diameter of the first hole and larger than a third diameter of the second hole, wherein the first shape has a fourth diameter less than the second diameter and the third diameter, and wherein the fastener comprises a body and collars adapted to fit at opposing ends of the fastener; and
    heating the fastener to a second temperature above the austenite start transition temperature such that the fastener changes from the first shape towards the second shape and establishes physical contact with a first surface of the first structure that defines the first hole and a second surface of the second structure that defines the second hole, wherein at least a first portion of the first structure proximate the first hole, at least a second portion of the second structure proximate the second hole, and the fastener undergo plastic deformation due to the physical contact.

2. The method of claim 1, wherein the fastener comprises nitinol and wherein the fastener is cold swaged in the martensite state to shrink the diameter of the fastener by an amount between two percent (2%) and ten percent (10%).

3. The method of claim 1, wherein the austenite start transition temperature is above 90 degrees Celsius.

4. The method of claim 1, wherein the shape memory alloy begins to plastically deform at a stress level between 5% and 10% greater than a yield stress of the first structure.

5. The method of claim 1, wherein the fastener includes a third hole to receive a heating element and wherein heating the fastener comprises inserting the heating element into the third hole and resistively heating the heating element to heat the fastener.

6. The method of claim 1, wherein a first collar of the collars comprises a second shape memory alloy.

7. The method of claim 1, wherein the body has an hourglass shape in the austenite state.

8. A method comprising:
    inserting a fastener in a martensite state into a first opening and a second opening, wherein the fastener comprises a shape memory alloy, wherein the fastener is configured to change from a first shape in the martensite state to a second shape in an austenite state when the fastener is heated to a first temperature above an austenite start transition temperature, and wherein the fastener comprises a body and collars adapted to fit at opposing ends of the fastener; and
    heating the fastener to a second temperature above the austenite start transition temperature such that the fastener changes from the first shape towards the second shape and establishes physical contact with a first surface of a first structure that defines the first opening and a second surface of a second structure that defines the second opening, wherein at least a first portion of the first structure proximate the first opening, at least a second portion of the second structure proximate the second opening, and the fastener undergo plastic deformation due to the physical contact.

9. The method of claim 8, wherein a first collar of the collars comprises a second shape memory alloy.

10. The method of claim 8, wherein heating the fastener comprises simultaneously transferring heat to the first structure, the second structure, and the fastener.

11. The method of claim 8, wherein the shape memory alloy begins to plastically deform at a stress level between 5% and 10% greater than a yield stress of the second structure.

12. The method of claim 8, wherein the collars include a first lock ring and a second lock ring.

13. The method of claim 12, wherein the first lock ring expands less than the second lock ring in response to heating the fastener to the temperature above the austenite start transition temperature.

\* \* \* \* \*